(12) United States Patent
Deng

(10) Patent No.: US 8,737,745 B2
(45) Date of Patent: May 27, 2014

(54) SCENE-BASED PEOPLE METERING FOR AUDIENCE MEASUREMENT

(75) Inventor: Kevin Keqiang Deng, Oldsmar, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 109 days.

(21) Appl. No.: 13/431,626

(22) Filed: Mar. 27, 2012

(65) Prior Publication Data

US 2013/0259323 A1 Oct. 3, 2013

(51) Int. Cl.
*G06K 9/00* (2006.01)
(52) U.S. Cl.
USPC .......................................... 382/190
(58) Field of Classification Search
None
See application file for complete search history.

(56) References Cited

U.S. PATENT DOCUMENTS

| | | | |
|---|---|---|---|
| 3,841,763 A | 10/1974 | Lewis | |
| 4,779,198 A | 10/1988 | Lurie | |
| 4,807,027 A | 2/1989 | Muto | |
| 5,987,154 A | 11/1999 | Gibbon et al. | |
| 6,263,088 B1 | 7/2001 | Crabtree et al. | |
| 6,295,367 B1 | 9/2001 | Crabtree et al. | |
| 6,577,346 B1 | 6/2003 | Perlman | |
| 6,580,372 B1 | 6/2003 | Harris | |
| 6,633,651 B1 | 10/2003 | Hirzalla et al. | |
| 6,771,818 B1 | 8/2004 | Krumm et al. | |
| 6,930,687 B2* | 8/2005 | Grosvenor et al. | 345/473 |
| 6,943,724 B1 | 9/2005 | Brace et al. | |
| 6,985,623 B2* | 1/2006 | Prakash et al. | 382/173 |
| 6,999,600 B2 | 2/2006 | Venetianer et al. | |
| 7,092,566 B2 | 8/2006 | Krumm | |
| 7,193,531 B2 | 3/2007 | Ito et al. | |
| 7,203,338 B2 | 4/2007 | Ramaswamy et al. | |
| 7,466,844 B2 | 12/2008 | Ramaswamy et al. | |
| 7,472,134 B2 | 12/2008 | Kaku | |
| 7,609,853 B2 | 10/2009 | Ramaswamy et al. | |
| 7,647,605 B2 | 1/2010 | Lu et al. | |
| 7,733,224 B2 | 6/2010 | Tran | |
| 7,926,073 B2 | 4/2011 | Buonasera et al. | |
| 8,054,177 B2 | 11/2011 | Graves et al. | |
| 8,091,100 B2 | 1/2012 | Donato | |
| 2002/0118287 A1* | 8/2002 | Grosvenor et al. | 348/222.1 |
| 2004/0019608 A1* | 1/2004 | Obrador | 707/104.1 |
| 2006/0153296 A1 | 7/2006 | Deng | |
| 2008/0046925 A1* | 2/2008 | Lee et al. | 725/37 |
| 2008/0068622 A1 | 3/2008 | Deng et al. | |
| 2008/0273795 A1* | 11/2008 | Ofek et al. | 382/170 |
| 2009/0055854 A1 | 2/2009 | Wright et al. | |

(Continued)

OTHER PUBLICATIONS

Wasim Khan, Shiv Kumar, Neetesh Gupta, Nilfar Khan. "Signature Based Approached for Image Retrieval Using Color Histogram and Wavelet Transform" International Journal of Soft Computing and Engineering, ISSN: 2231-2307.*

*Primary Examiner* — Barry Drennan
*Assistant Examiner* — Oneal R Mistry
(74) *Attorney, Agent, or Firm* — Hanley, Flight & Zimmerman, LLC

(57) ABSTRACT

Scene-based people metering for audience measurement is disclosed. An example method disclosed herein to perform people metering for audience measurement comprises segmenting image frames depicting a location in which an audience is expected to be present to form a sequence of scenes, for a first scene in the sequence of scenes, identifying a key frame representing a first sequence of image frames corresponding to the first scene, and processing the key frame to identify an audience depicted in the first scene.

18 Claims, 9 Drawing Sheets

(56) References Cited

U.S. PATENT DOCUMENTS

| | | |
|---|---|---|
| 2009/0123025 A1 | 5/2009 | Deng et al. |
| 2009/0290791 A1* | 11/2009 | Holub et al. ................ 382/164 |
| 2010/0046797 A1 | 2/2010 | Strat et al. |
| 2010/0070523 A1* | 3/2010 | Delgo et al. ................ 707/769 |
| 2010/0246965 A1* | 9/2010 | Epshtein et al. ............. 382/187 |
| 2011/0243459 A1 | 10/2011 | Deng |
| 2011/0249004 A1* | 10/2011 | Cheswick ................... 345/440 |
| 2012/0020559 A1* | 1/2012 | Deng et al. ................. 382/173 |
| 2012/0027299 A1* | 2/2012 | Ran .............................. 382/173 |
| 2013/0258084 A1 | 10/2013 | Deng |

* cited by examiner

SCENE-BASED PEOPLE METERING FOR AUDIENCE MEASUREMENT

FIELD OF THE DISCLOSURE

This disclosure relates generally to audience measurement and, more particularly, to scene-based people metering for audience measurement.

BACKGROUND

Audience measurement systems typically include one or more device meters to monitor the media presented by one or more media presentation devices located at a monitored site. Many such audience measurement systems also include one or more people meters to obtain information characterizing the composition(s) of the audience(s) in the vicinity of the media presentation device(s) being monitored. Prior people meters generally fall into two categories, namely, active people meters or passive people meters. An active people meter obtains audience information by actively prompting an audience member to press an input key or otherwise enter information via the people meter. A passive people meter obtains audience information by passively monitoring the audience, usually by using facial recognition techniques to count and/or identify the individual audience members included in the audience.

DETAILED DESCRIPTION

Figure 1:
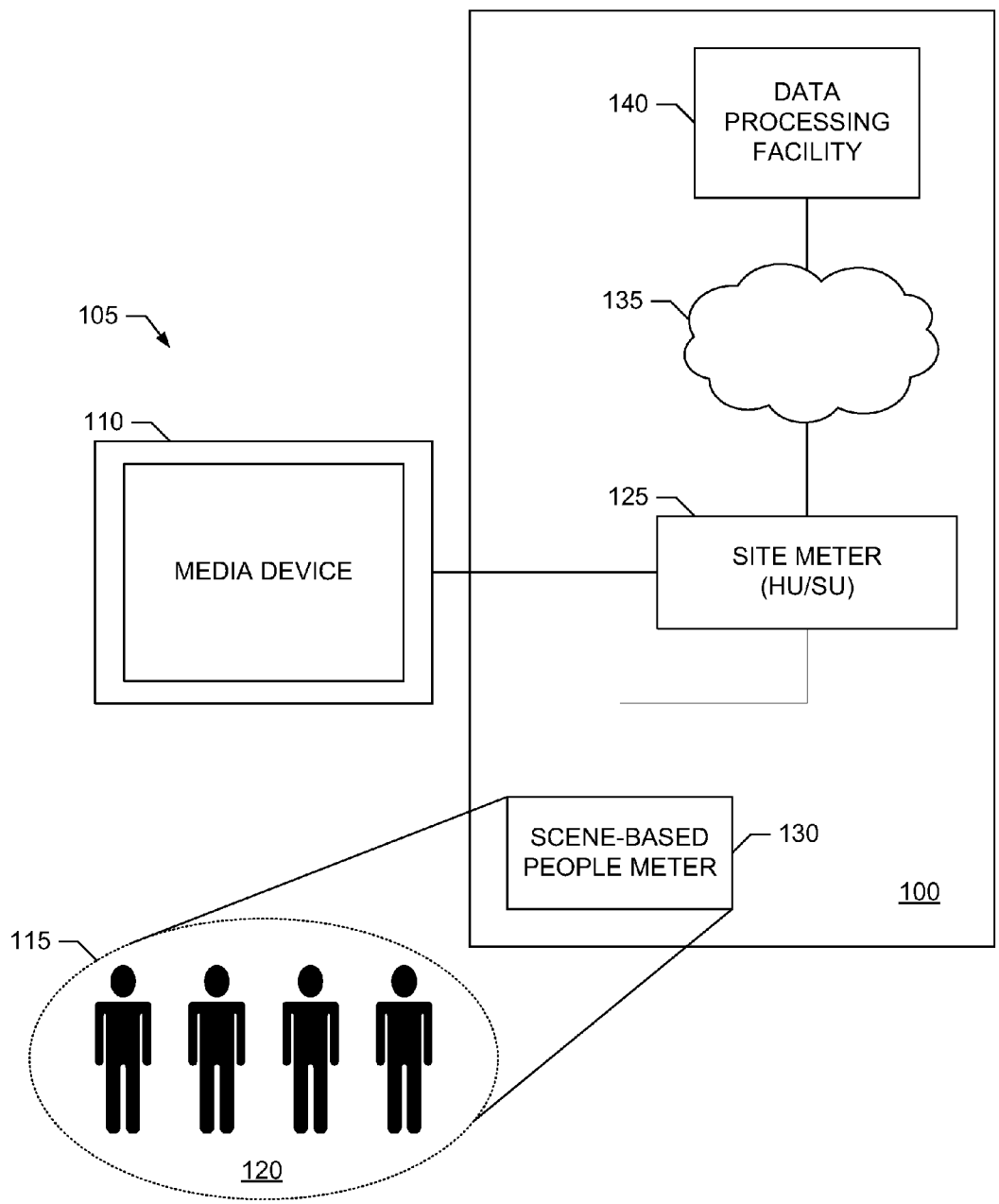
FIG. 1 is a block diagram of an example audience measurement system employing scene-based people metering as disclosed herein.

Example methods, apparatus and articles of manufacture to implement scene-based people metering for audience measurement are disclosed herein. As noted above, prior people meters for audience measurement are generally either active or passive. An active people meter obtains audience information by actively prompting an audience to enter information for audience member identification. A passive people meter obtains audience information passively, usually by capturing images of the audience using a camera and employing facial recognition to identify the individual audience members included in the audience. As used herein, facial recognition processing includes processing to one or both of (i) detect (e.g., to count) faces in an image/scene and/or (ii) identify particular person(s) corresponding to particular face(s) in an image/scene. Similarly, audience recognition includes operations/processing to (i) detect (e.g., to count) audience members in an image/scene and/or (ii) identify particular audience member(s) in an image/scene. Active people meters are generally simpler and less costly than passive people meters, but are prone to measurement error due to audience fatigue over time, lack of audience compliance, etc. Passive people meters do not rely on audience compliance and, thus, can be more reliable, but also require substantially more computing resources to implement accurate facial recognition processing. As such, passive people meters are often too costly to deploy in a statistically significant number of monitored sites. Additionally, the potentially costly facial recognition processing can slow down the image capture rate, making metering results less granular in time.

Scene-based people metering, as disclosed herein, employs passive people metering, which can improve measurement accuracy and reduce reliance on audience compliance relative to prior active people metering approaches. However, unlike prior passive people metering approaches, scene-based people metering as disclosed herein further focuses audience recognition processing on a subset of the captured image frames (e.g., the key frames described below) corresponding to changes in the audience environment being metered, then backtracks or otherwise propagates the results of the recognition processing performed on these particular frames to the other captured image frames. Accordingly, in at least some examples, scene-based people metering as disclosed herein does not incur the costs associated with prior passive metering techniques that require facial recognition to be performed on each captured image of the audience.

Example methods disclosed herein to perform scene-based people metering for audience measurement include obtaining image frames depicting a location in which an audience is expected to be present. The example methods also include segmenting the image frames to form a sequence of scenes. The example methods further include, for a next scene in the sequence of scenes, processing a key frame representing a first sequence of image frames forming the next scene to identify an audience depicted in the next scene. For example, such processing of the key frame can include performing facial recognition processing on the key frame to identify audience members depicted in the next scene. Some example methods perform facial recognition processing on the key frame with the assistance of previously determined identification information. Some example methods rank the scenes (or the key frames representing the scenes) and process the key frames based on the rankings.

In some disclosed examples, the captured image frames are segmented to form the sequence of scenes by determining image signatures representative of the image frames, and then including successive frames having similar image signatures in respective sequences of image frames (also referred to herein as segments of image frames). In such examples, each sequence (segment) of image frames forms a respective scene in the sequence of scenes. In some examples, the key frame used to represent the next scene can, therefore, correspond to at least one of a starting image frame, a midpoint image frame, an ending video image or a statistical combination of the sequence of image frames forming the next scene.

Some disclosed example methods process the key frame used to represent the first sequence of image frames forming the next scene by comparing an image signature representative of the key frame with a set of reference signatures representative of a set of reference scenes to determine a comparison result. In such examples, the key frame is then processed based on the comparison result to identify audience members depicted in the next scene. For example, the key frame can be assigned to a processing queue with a first priority (e.g., and with no suggestion for performing audience recognition) when the comparison result indicates that the image signature does not match at least one reference signature in the set of reference signatures. However, the key frame can be assigned to the processing queue with a second priority, which is lower than the first priority, (and with a suggestion for performing audience recognition) when the comparison results indicates that the image signature matches at least one reference signature in the set of reference signatures. Such example methods then use the priorities associated with the key frames included in the processing queue to determine how to prioritize performing facial recognition processing on the different key frames in the queue to identify the audience members depicted in the respective scenes represented by the key frames. Such example methods can also use any suggestions for performing audience recognition that are provided with the key frame(s). For example, such a suggestion for a particular key frame can include likely facial positions, sizes, orientations, etc., that are associated with a reference signature that was determined to match the image signature representative of the key frame. Because key frames are stored in the processing queue, audience recognition processing can be performed offline (e.g., not in real time), which can decouple the effects of such processing on the image capture rate and the associated time granularity of people metering for audience measurement.

Additionally or alternatively, some disclosed example methods determine whether the comparison result indicates that a key image signature, which is representative of the key image for the next scene, matches a first reference signature in the set of reference signatures. In such examples, audience identification information already associated with a first reference scene represented by the first reference signature is used to infer or otherwise identify the audience members depicted in the next scene. In some examples, the audience identification information already associated with the matching first reference scene is reported in lieu of performing audience recognition on the key image for the next scene if such audience recognition processing has not completed by the time the reporting is to occur. Additionally or alternatively, some examples methods associate audience identification information with the key image signature, which is representative of the key image for the next scene. Such example methods then include the key image signature in the set of reference signatures for comparison with a second image signature representative of a subsequent scene occurring after the next scene.

Some disclosed example methods further cluster the sequence of scenes into a set of one or more distinct scenes (also referred to herein as unique scenes, representative scenes, etc.). In such examples, the sequences of scenes are clustered into clusters of matching scenes that have matching key image frames and/or matching key image signatures (or substantially matching key image frames/signatures within a tolerance level, threshold, etc.). Each scene cluster is represented by a representative key frame selected from other determining by combining the key frames of the scenes included in the cluster. In examples employing scene clustering, audience recognition processing can be performed on just the representative key frame for each cluster (e.g., by storing just the representative key frames for the clusters in the processing queue described above), with the audience identification results for the representative key of a particular scene cluster being propagated (e.g., back-tracked, assigned, etc.) to all the scenes included in that cluster. Furthermore, in some examples, the scene clusters can be ranked based on, for example, the size of the clusters, where the size of a cluster corresponds to the number of images included in the cluster (e.g., corresponding to the total number of images over the image sequences forming the scenes included in the cluster). In such examples, the representative key frames for the scene clusters stored in the processing queue can be assigned ranks based on their cluster sizes, and the (potentially costly) audience recognition processing can be applied to the representative key frames in accordance with the assigned ranks (e.g., with larger clusters being processed before smaller clusters).

Example apparatus to implement scene-based people metering for audience measurement, and example articles of manufacture (e.g., storage media) storing machine readable instructions which, when executed, cause example machine(s) to perform scene-based people metering for audience measurement, are also disclosed herein.

Turning to the figures, a block diagram of an example audience metering system 100 employing scene-based people metering as disclosed herein is illustrated in FIG. 1. The example audience measurement system 100 supports monitoring of media content exposure to audiences at one or more monitored sites, such as the example monitored site 105 illustrated in FIG. 1. The monitored site 105 includes an example media presentation device 110 and an example audience area 115. The audience area 115 corresponds to one or more locations at the monitored site 105 in which an audience 120 is expected to be present when consuming media content (e.g., viewing and/or hearing the media content, interacting with the content, etc.) presented by the media presentation device 110. The audience area 115 can include, but is not limited to, a room containing the media presentation device 110, a sitting area in front of the media presentation device 110, etc. Although the example of FIG. 1 illustrates one monitored site 105, scene-based people metering as disclosed herein can be used in audience measurement systems 100 supporting any number of monitored sites 105.

The audience measurement system 100 of the illustrated example includes an example site meter 125, also referred to as a site unit 125, a home unit 125, etc., to monitor media content presented by the media presentation device 110. To support scene-based people metering at the monitored site 105 in accordance with the examples described herein, the example audience measurement system 100 of FIG. 1 also includes an example scene-based people meter 130, which is described in greater detail below. In the illustrated example, the site meter 125 determines audience measurement data characterizing media content exposure at the monitored site 105 by combining metering data (also referred to as content metering data, content monitoring data, content measurement data, tuning data, etc.), which is determined by monitoring the media presentation device 110, with audience identification data (also referred to as demographic data, people meter data, etc.), which is provided by the scene-based people meter 130. The audience measurement meter 125 then stores and reports this audience measurement data via an example network 135 to an example data processing facility 140. The data processing facility 140 performs any appropriate post-processing of the audience measurement data to, for example, determine audience ratings information, identify targeted advertising to be provided to the monitored site 105, etc. In the illustrated example, the network 135 can correspond to any type(s) and/or number of wired and/or wireless data networks, or any combination thereof.

In the illustrated example, the media presentation device 110 monitored by the site meter 125 can correspond to any type of audio, video and/or multimedia presentation device capable of presenting media content audibly and/or visually. For example, the media presentation device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As another example, the media presentation device 110 can correspond to a multimedia computer system, a personal digital assistant, a cellular/mobile smartphone, a radio, etc.

The site meter 125 included in the audience measurement system 100 of the illustrated example can correspond to any type of metering device capable of monitoring media content presented by the media presentation device 110. As such, the site meter 125 may utilize invasive monitoring involving one or more physical connections to the media presentation device 110, and/or non-invasive monitoring not involving any physical connection to the media presentation device 110. For example, the site meter 125 may process audio signals obtained from the media presentation device 110 via a microphone and/or a direct cable connection to detect content and/or source identifying audio codes and/or audio watermarks embedded in audio portion(s) of the media content presented by the media presentation device 110. Additionally or alternatively, the site meter 125 may process video signals obtained from the media presentation device 110 via a camera and/or a direct cable connection to detect content and/or source identifying video codes and/or video watermarks embedded in video portion(s) of the media content presented by the media presentation device 110. Additionally or alternatively, the site meter 125 may process the aforementioned audio signals and/or video signals to generate respective audio and/or video signatures from the media content presented by the media presentation device 110, which can be compared to reference signatures to perform source and/or content identification. Any other type(s) and/or number of media content monitoring techniques can additionally or alternatively be supported by the site meter 125.

Figure 2:
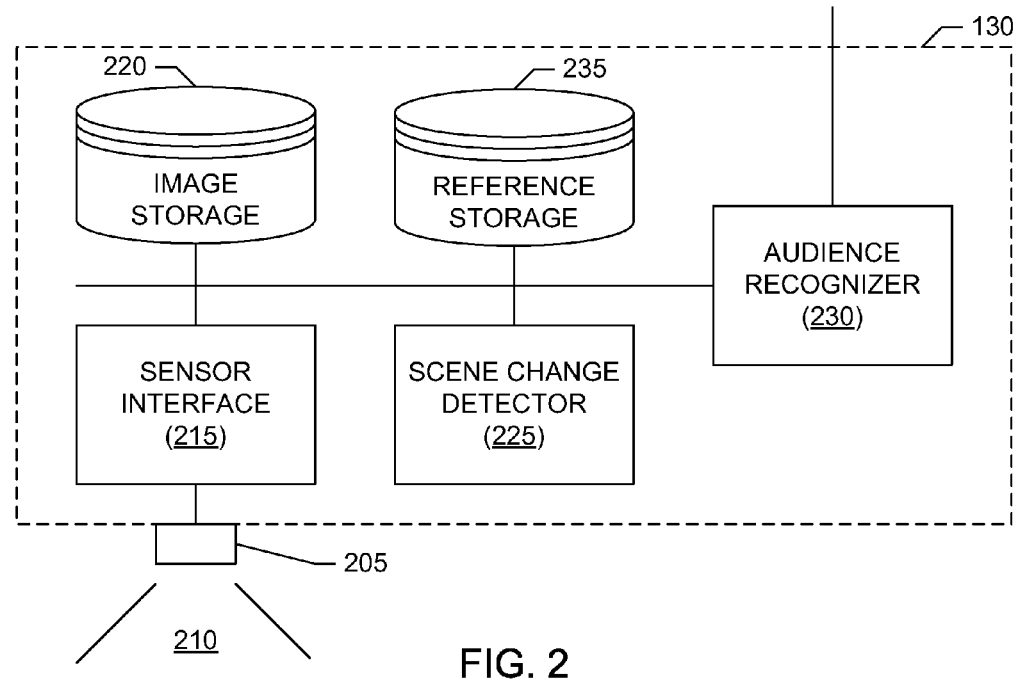
FIG. 2 is a block diagram of an example scene-based people meter that can be used to implement the example audience measurement system of FIG. 1.

In the example of FIG. 1, the audience measurement system 100 includes the example scene-based people meter 130 to capture information about the audience 120 that is exposed to the media content presented by the media presentation device 110. A block diagram of an example implementation of the scene-based people meter 130 of FIG. 1 is illustrated in FIG. 2. The example scene-based people meter 130 of FIG. 2 includes an example imaging sensor 205, such as a camera, from which image frames are obtained that depict a scene in which the audience 120 is expected to be present. For example, the imaging sensor 205 of the scene-based people meter 130 can be positioned such that its field of view 210 includes the audience area 115. As described in greater detail below, the scene-based people meter 130 uses the captured image frames to identify the audience 120 passively or, in other words, without requiring the audience 120 to actively provide audience identification information (e.g., demographic information).

To control operation of the imaging sensor 205, the scene-based people meter 130 of FIG. 2 includes an example sensor interface 215. The sensor interface 215 can be implemented using any appropriate type(s) and/or number of interface(s) to enable controlling when the imaging sensor 205 is to capture image frames, to enable receiving the captured image frames, and to enable storing the captured image frames. In the illustrated example, the sensor interface 215 causes the imaging sensor 205 to capture image frames at a frame rate that may be pre-configured, specified as a parameter during configuration of the scene-based people meter 130, etc. The sensor interface 215 also causes the captured image frames to be stored in an example image storage 220 using any appropriate image format. The image storage 220 may be implemented by any type of a storage or memory device, a database, etc., such as the mass storage device 1128 and/or the volatile memory 1114 included in the example processing system 1100 of FIG. 11, which is described in greater detail below.

The example scene-based people meter 120 of FIG. 2 further includes an example scene change detector 225 to segment the image frames captured by the image sensor 205 and stored in the image storage 220 into a sequence of scenes for which audience identification is to be performed. A scene corresponds to a sequence (or segment) of successive image frames having substantially similar image characteristics. For example, a scene may correspond to a sequence of successive images frames having foreground components (e.g., which may correspond to members of the audience 120) and a background (e.g., which may correspond to the environment of the audience area 115) that are relatively unchanging over time. The scene change detector 225 of the illustrated example utilizes scene change detection to mark the beginning image frame and the ending image frame corresponding to a scene, thereby grouping the sequence of image frames from the beginning image frame to the ending image frame into the scene. In some examples, the scene change detector 225 performs scene change detection by creating an image signature for each frame in the sequence of captured image frames (possibly after subsampling) and then comparing the image signatures to determine when a scene change occurs. For example, the scene change detector 225 may compare the image signature corresponding to the starting image of a scene to the image signatures for one or more successive image frames following the starting frame. If the image signature for the starting frame does not differ significantly from a successive frame's image signature (e.g., such as when the audience 120 has not changed between the two image frames), the successive frame is included in the sequence forming the same scene as the starting frame. However, if the image signatures are found to differ significantly (e.g., such as when the audience 120 has changed between the two image frames), the successive frame that differs is determined to be the start of a new scene and becomes the first frame in the sequence forming that new scene.

After a scene is detected, the scene change detector 225 of the illustrated example also determines key frame(s) and an image signature of the key frame(s) (referred to herein as the key image signature) that are to be representative of the scene. The scene change detector 225 stores the key frame(s) and the key image signature(s) in the image store 220. For example, the key frame and the key image signature for the scene may be chosen to be the frame and signature corresponding to the first frame in the scene, the last frame in the scene, the midpoint frame in the scene, etc. In other examples, the key frame and the key image signature may be determined to be an average and/or some other statistical combination of the sequence of image frames and/or signatures corresponding to the detected scene. In some examples, such as in the case of scenes having long image sequences, multiple key frames and associated key image signatures may be used to represent the scene (e.g., by choosing frames interspersed within the image sequence forming the scene, such as by choosing every Nth image frame to be a key frame, where N is some positive integer number). By segmenting the image frames captured by the imaging sensor 205 into scenes corresponding to image sequences represented by key frames, the scene-based people meter 130 can focus audience recognition processing on just the key frames corresponding to the scene changes, unlike prior passive people meters that performing audience recognition on all captured image frames.

Figure 3:
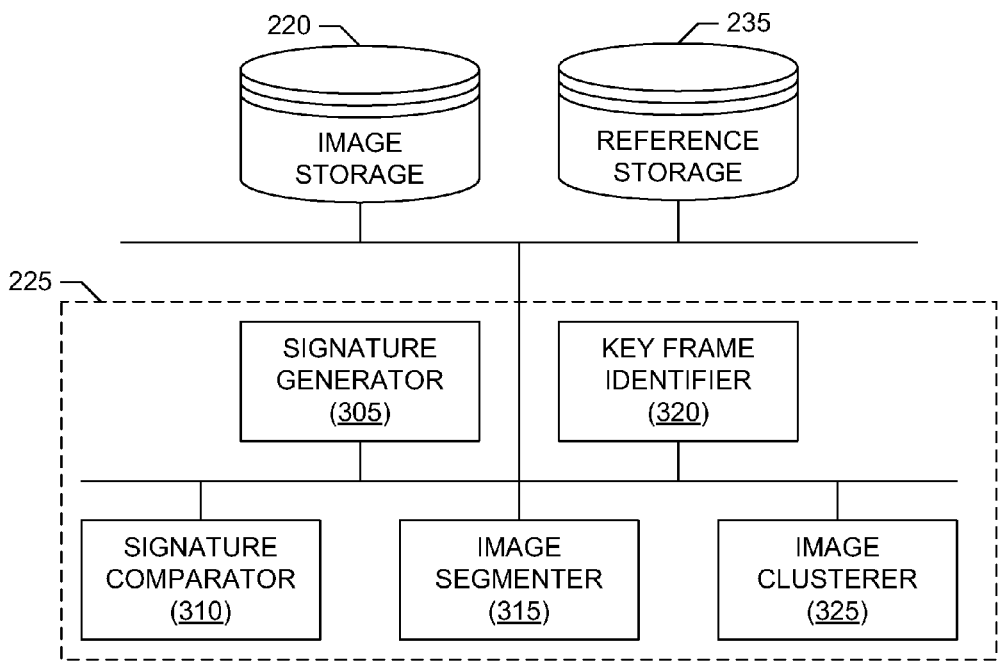
FIG. 3 is a block diagram of an example scene change detector that may be used to implement the example scene-based people meter of FIG. 2.

In some examples, because the scene change detector 225 processes the image frames after they are stored in the image storage 215, the scene change detector 225 can perform its scene detection processing off-line, rather than in real-time as the image frames are captured. Such off-line processing can involve few processing resources that would be required for real-time processing, thereby further reducing the cost of the scene-based people meter 130 relative to prior passive people meters. An example implementation of the scene change detector 225 is illustrated in FIG. 3, which is described in greater detail below. In some examples, the scene change detector 225 performs scene change detection in real-time, whereas the subsequent audience recognition processing of the scenes (e.g., discussed below) is performed off-line on the key images representative of the scenes.

To perform audience recognition and identification, the example scene-based people meter 130 of FIG. 2 includes an example audience recognizer 230. In the illustrated example, the audience recognizer 230 retrieves, from the image storage 220, the key frames corresponding to the scenes detected by the scene change detector 225. The audience recognizer 230 then performs facial recognition processing, and/or any other number and/or type(s) of image processing, on each key frame to identify member(s) of the respective audience 120 depicted in each one of the key frames.

In some examples, when processing a key frame corresponding to a detected scene, the audience recognizer 230 additionally or alternatively compares the key frame to a set of reference images stored in an example reference storage 235. (As discussed in greater detail below, such comparison of key frame(s) to reference images can be performed by comparing key image signature(s) representative of the key frame(s) with reference signatures representative of the reference images. In such examples, the reference signatures may be stored in the reference storage 235 instead of, or in addition to, the reference images.) The reference storage 235 may be implemented by any type of a storage or memory device, a database, etc., such as the mass storage device 1128 and/or the volatile memory 1114 included in the example processing system 1100 of FIG. 11, which is described in greater detail below. The reference images (and/or reference signatures) stored in the reference storage 235 are representative of a history of reference scenes for which audience recognition has been performed by the scene-based people meter 130 in the past. If the key frame for the detected scene being processed matches at least one of the reference images, the audience recognizer 230 determines that the audience 120 depicted in the key frame corresponds to the reference audience associated with the matching reference image (or signature). In such cases, the audience recognizer 230 can use reference audience identification information (e.g., reference demographic information) already associated with the matching reference audience to identify the audience 120 depicted in the key frame of the detected scene being processed. Furthermore, when the key frame for the detected scene being processed matches at least one of the reference images, the audience recognizer 230 may, in some example, also perform facial recognition processing, and/or any other number and/or type(s) of image processing on the key frame to verify/update the reference audience identification information already associated with the matching reference image. However, the audience recognizer 230 may prioritize such processing on the key frame at a lower priority than if the key frame had not matched any of the reference images and, thus, had corresponded to a new audience to be identified.

Figure 5:
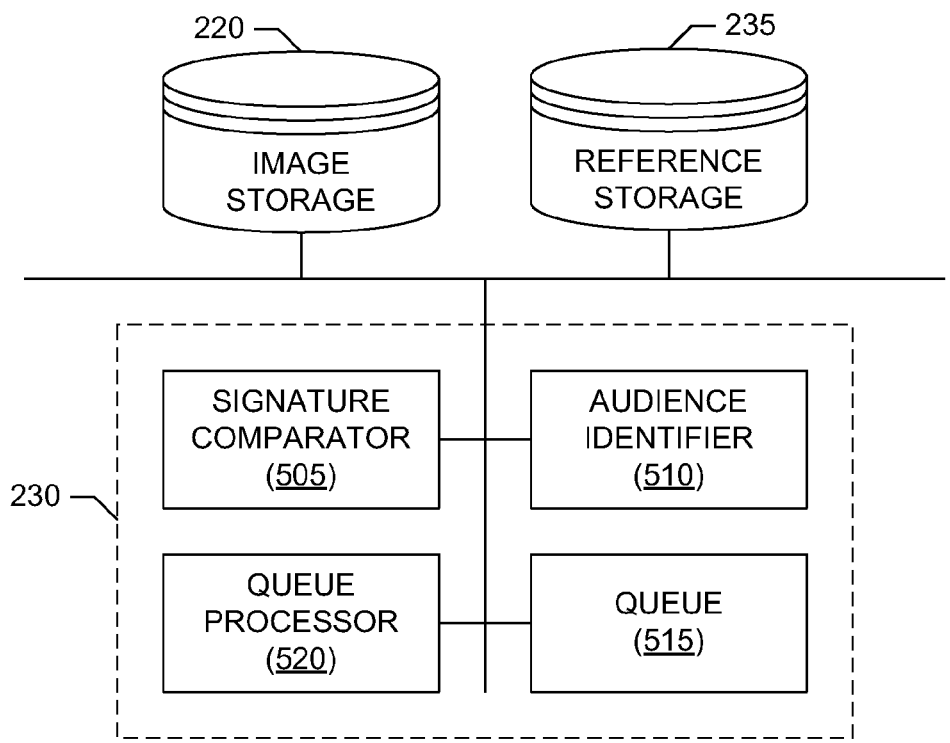
FIG. 5 is a block diagram of an example audience recognizer that may be used to implement the example scene-based people meter of FIG. 2.

After identifying the audience 120 depicted in the key frame of the scene being processed (e.g., via facial recognition processing, etc., and/or by matching the key frame with a reference image), the audience recognizer 230 reports the audience identification information for the audience 120 to the site meter 125 (not shown in FIG. 2). In some examples, the audience recognizer 230 stores the audience identification information with the key frame (or key image signature) in the reference storage 235 as another reference image (or signature) and associated reference audience identification information for comparing with a subsequent key frame representative of a subsequent scene to be processed. An example implementation of the audience recognizer 230 is illustrated in FIG. 5, which is described in greater detail below.

An example implementation of the scene change detector 225 of FIG. 2 is illustrated in FIG. 3. The example scene change detector 225 of FIG. 3 employs image signatures and image signature comparison to segment the image frames stored in the image store 220 into a sequence of scenes corresponding to detected changes in the audience area 115. Generally, an image signature is a proxy representative of the associated image, and can take the form of, for example, one or more digital values, a waveform, etc. Because image signatures are proxies representing their associated images, the signatures of two images can be compared to determine whether their respective images are substantially similar or identical. Generally, if two image signatures match or substantially match (e.g., at least within some tolerance or deviation level), then the respective images they represent are substantially similar or identical. Typically, signature comparison is simpler and requires less processing resources than direct image comparison, and is more robust against insignificant changes between the images. Moreover, using signatures to compare images can address privacy concerns by removing the need to store images of scenes potentially depicting audience members.

Thus, to implement image grouping for scene detection, the scene change detector 225 of FIG. 3 includes an example signature generator 305, an example signature comparator 310 and an example image segmenter 315. The signature generator 305 of the illustrated example generates image signatures representative of the image frames retrieved from the image storage 220 (e.g., and which were obtained by the imaging sensor 205). In some examples, the image signature generated by the signature generator 305 for a given image frame corresponds to an image histogram of the luminance and/or chrominance values included in the image frame. Further examples of image signatures that can be generated by the signature generator 330 include, but are not limited to, the examples described in U.S. Patent Publication No. 2011/0243459, entitled "Methods and Apparatus to Detect Differences Between Images" and published on Oct. 6, 2011; U.S. Patent Publication No. 2009/0123025, entitled "Methods and Apparatus to Measure Brand Exposure in Media Stream" and published on May 14, 2009; U.S. Patent Publication No. 2008/0068622, entitled "Methods and Apparatus to Identify Images in Print Advertisements" and published on Mar. 20, 2008; U.S. Publication No. 2006/0153296, entitled "Digital Video Signature Apparatus and Methods for Use with Video Program Identification Systems" and published on Jul. 13, 2006; U.S. Pat. No. 6,633,651, entitled "Method and Apparatus for Recognizing Video Sequences" and issued on Oct. 14, 2003; and U.S. Pat. No. 6,577,346, entitled "Recognizing a Pattern in a Video Segment to Identify the Video Segment" and issued on Jun. 10, 2003. U.S. Patent Publication Nos. 2011/0243459, 2009/0123025, 2008/0068622 and 2006/0153296, and U.S. Pat. Nos. 6,633,651 and 6,577,346, are hereby incorporated by reference in their respective entireties.

The example signature comparator 310 included in the scene change detector 225 of FIG. 3 compares the image signatures generated by the signature generator 305 for pairs of image frames stored in the image storage 220 (e.g., and which were obtained by the imaging sensor 205). The signature comparator 310 can implement any type(s) and/or number of comparison criteria, such as a cross-correlation value, a Hamming distance, etc., to determine whether the image signatures for a pair of image frames match or substantially match within a particular tolerance level (e.g., which may be predetermined, specified as a configuration parameter or input, etc.).

The example image segmenter 315 included in the scene change detector 225 of FIG. 3 uses the results of the image signature comparisons performed by the signature comparator 310 to segment the image frames stored in the image storage 220 (e.g., and which were obtained by the imaging sensor 205) into image sequences (also referred to as image segments) forming a respective sequence of scenes (e.g., where each scene depicts a change in the audience 120 being monitored). The image segmenter 315 of the illustrated example segments image frames into scenes by using the signature comparator 310 to compare image frames to a starting frame representative of a current scene being detected. As discussed above, successive image frames that have similar image signatures are grouped together to form an image sequence representative of a scene. In the illustrated example, to segment image frames into a current scene that begins with a starting image frame, the image segmenter 315 compares the image signature for a next image frame with the image signature for the starting frame of the current scene currently being detected. If the signature comparator 310 determines that the image signature for the next image frame matches (or substantially matches within a particular tolerance level) the starting frame's image signature, the image segmenter 315 includes the current image frame in the sequence of images forming the current scene being detected. This procedure is then repeated for successive image frames until the signature comparator 310 determines that the image signature for one of the successive images does not match the starting frame's image signature.

When the current image frame being processed is determined to not match the starting frame of the current scene being detected, the image segmenter 315 identifies this current image frame as starting a new scene. The image segmenter 315 also denotes the current image frame as the starting frame for that new scene, and stores the image signature for the current frame for use as the starting image signature for that new scene. The example image segmenter 315 also marks the immediately previous frame as the ending frame for the sequence of image frames forming the current scene that was just detected. In this way, the sequence of successive image frames beginning from a scene's starting image frame and ending with the scene's ending image frame are grouped (or, in other words, segmented) to form the scene.

The scene change detector 225 of FIG. 3 further includes an example key frame identifier 320 to determine the key frames used to represent the sequence of scenes formed by segmenting the image frames stored in the image storage 220 (e.g., and which were obtained by the imaging sensor 205) into image sequences, and to also determine the key image signatures representative of the key frames. In some examples, the key frame identifier 320 determines the key frame and key image signature for a given scene to be the image frame and image signature corresponding to either the starting frame in the sequence of frames forming the scene, or the last frame in the sequence of frames forming the scene, or the midpoint frame in the sequence of frames forming the scene, or any other frame in the sequence of frames forming the scene. In some examples, the key frame identifier 320 determines the key frame for a given scene to be an average or some other statistical combination of the image frames included in the sequence of frames forming the scene. In such examples, the key frame identifier 320 may use the signature generator 305 to generate the key image signature from the resulting key frame, or the key frame identifier 320 may perform the same averaging or other statistical processing on the image signatures for the sequence of image frames forming the scene to determine a resulting key image signature. In some examples, to accurately identify a particular scene in a sequence of scenes, the key frame identifier 320 also associates a scene's starting frame time/number and the scene's ending frame time/number with the key frame and/or key image signature representative of the scene.

Figure 4A:
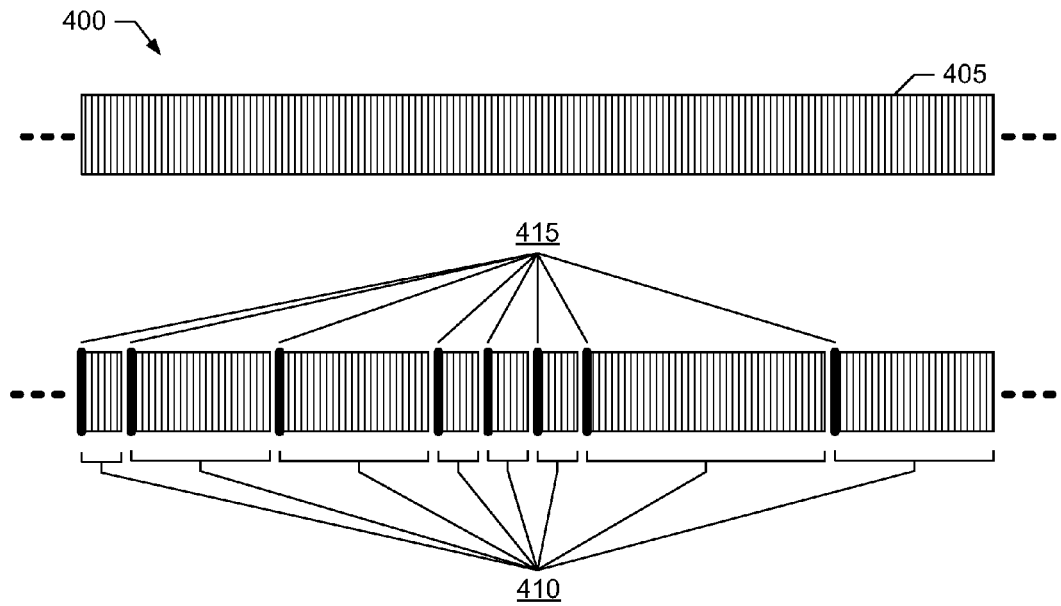
FIG. 4A illustrates a first example operation of the scene change detector of FIG. 3 to segment images into scenes.

FIG. 4A illustrates an example operation 400 of the scene change detector 225 of FIG. 3 to segment image frames to form image sequences corresponding to a respective sequence of scenes. In the example operation 400 of FIG. 4A, the scene change detector 225 retrieves image frames 405 from the image storage 220. As described above, the image frames 405 are captured by the imaging sensor 205 and depict the audience area 115 in which an audience 120 is expected to be present. In the example operation 400 of FIG. 4A, the scene change detector 225 then segments the image frames 405 into an example sequence of scenes 410 represented by respective example key frames 415. In the illustrated example operation 400 of FIG. 4A, the scene change detector 225 determines the key frames 415 to be the starting frames of each of the image sequences forming the scenes 410. As can be seen from the example of FIG. 4A, focusing audience recognition processing on just the key frames 415 instead of all of the image frames 405 can significantly reduce the processing costs associated with the scene-based people meter 130.

Figure 4B:
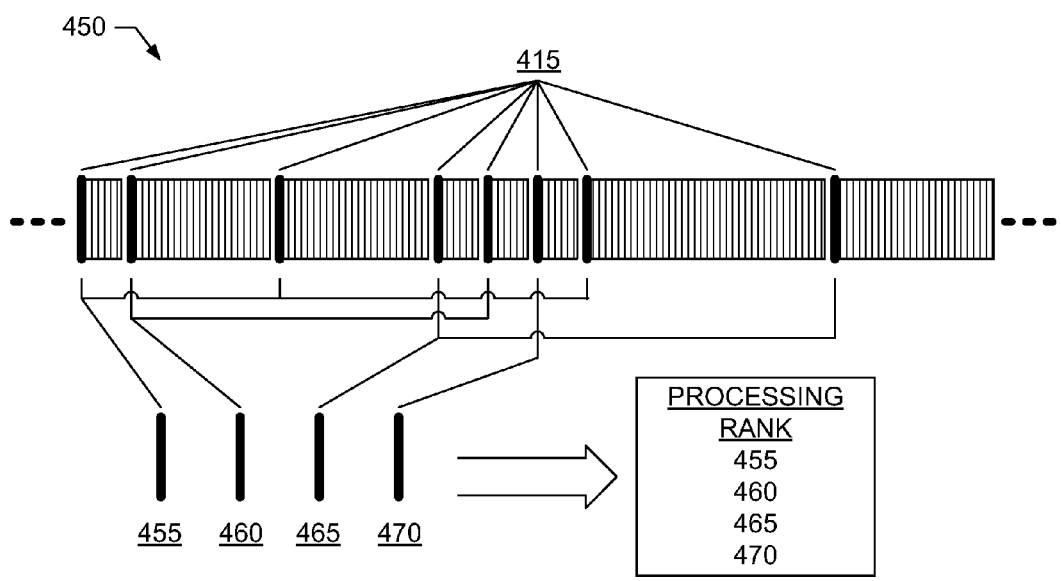
FIG. 4B illustrates a second example operation of the scene change detector of FIG. 3 to cluster scenes into scene clusters.

FIG. 4B illustrates an example operation 450 of the scene change detector 225 of FIG. 3 to cluster scenes into scene clusters. With reference to FIG. 3, in some examples, the scene change detector 225 further includes an example image clusterer 325 to cluster the sequence of scenes and associated key frames determined by the image segmenter 315 and the key frame identifier 320 into clusters of matching scenes, where each scene cluster is represented by a representative key image formed or selected from the key frames of the scenes included in the cluster. For example, the image clusterer 325 can compare the key image signatures for the key frames of the scenes determines by the scene change detector 225 to identify matching key frame signatures (or key frame signatures that substantially match with a tolerance level, threshold, etc.). In such examples, the scenes having matching key frame signatures are further clustered (e.g., grouped) to form a scene cluster. The representative key frame for the scene cluster can be selected from among the key frames of the scenes included in the scene cluster, or determined to be a combination (e.g., statistical combination) of the key frames of the scenes included in the scene cluster.

In some examples in which scene clustering is employed, audience recognition processing can be performed on just the representative key frame for each cluster (e.g., by storing just the representative key frames for the clusters in the processing queue 515 described in greater detail below), with the audience identification results for the representative key of a particular scene cluster being propagated (e.g., back-tracked, assigned, etc.) to all the scenes included in that cluster. Furthermore, in some examples, the scene clusters can be ranked based on, for example, the size of the clusters. The size of a cluster corresponds to the number of images included in the cluster (e.g., corresponding to the total number of images over all of the image sequences forming all of the scenes included in the cluster). In such examples, the audience recognition processing can be applied to the representative key frames of the scene clusters in accordance with the ranks assigned to the different scene clusters.

Turning to the example operation 450 of FIG. 4B, the image clusterer 325 compares the key image signatures for the key frames 415 of the sequence of scenes 410 to determine a scene clusters represented by the representative key frames 455, 460, 465 and 470. In the illustrated example of FIG. 4B, the image clusterer 325 groups the first, third and seventh scenes into a first image cluster represented by the representative key frame 455. The image clusterer 325 also groups the second and fifth scenes into a second image cluster represented by the representative key frame 460. The image clusterer 325 further groups the fourth and eighth scenes into a third image cluster represented by the representative key frame 465. The image clusterer 325 finally groups the sixth scene into a third image cluster represented by the representative key frame 470.

In the illustrated example of FIG. 4B, the representative key frames 455, 460, 465 and 470 are then subjected to audience recognition according to their rank, with the representative key frame 455 being ranked the highest because it represents the scene cluster having the largest size, and the representative key frame 470 being ranked the lowest because it represents the scene cluster having the smallest size. After audience recognition processing is performed for a representative key frame, the audience identification results are propagated to all scenes in the scene cluster corresponding to the representative key frame. For example, the audience identification results from processing the representative key frame 455 are propagated (e.g., backtracked or assigned to) the first, third and seventh scenes included in the first image cluster represented by the representative key frame 455.

An example implementation of the audience recognizer 230 of FIG. 2 is illustrated in FIG. 5. The example audience recognizer 230 of FIG. 5 determines audience identification information (e.g., audience demographic data) for audiences 120 depicted in the key frames representing the sequence of scenes detected by the scene change detector 225. As described above, each scene corresponds to a likely change in the audience 120 or the environment. In some examples, the audience recognizer 230 of FIG. 5 varies the audience recognition processing performed on the key frames representing the sequence of scenes depending on whether a particular key frame (or signature) matches a reference image (or reference signature) in a set of reference images (or reference signatures) corresponding to reference audience(s) that have been previously identified by the audience recognizer 230. In such examples, the audience recognizer 230 of FIG. 5 can utilize image signature comparison to determine whether a particular key frame signature matches at least one of the reference signatures corresponding to the reference audience(s).

For example, the audience recognizer 230 of FIG. 5 includes an example signature comparator 505, which may be the same as or similar to the signature comparator 310, to compare the key image signatures stored in the image storage 220, and which are representative of the key frames corresponding to the detected scenes, with reference signatures (also referred to as reference image signatures) stored in the reference storage 235, and which are representative of the reference audience(s) that have been previously identified by the audience recognizer 230. To compare a particular key frame with the set of reference images, the signature comparator 505 retrieves the key image signature representative of the key frame from the image storage 220. The signature comparator 505 then compares the key image signature with reference signatures retrieved from the reference storage 235 to determine whether the key image signature and one of the reference signatures match or substantially match within a particular tolerance level (e.g., which may be predetermined, specified as a configuration parameter or input, etc.). The signature comparator 310 can implement any type(s) and/or number of comparison criteria, such as a cross-correlation value, a Hamming distance, etc., to perform the signature comparison.

The audience recognizer 230 of FIG. 5 also includes an example audience identifier 510 that performs audience recognition processing on a particular key frame based on the comparison result determined by the signature comparator 505 for the key frame. For example, if the comparison result determined by the signature comparator 505 for a particular key frame indicates that the key frame's image signature does not match any of the reference signatures, then the audience identifier 510 can perform audience recognition processing, such as facial recognition processing, on the key frame to identify the audience 120 depicted in the scene represented by the key frame. However, if the comparison result determined by the signature comparator 505 for the particular key frame indicates that the key frame's image signature matches (or substantially matches) one of the reference signatures, then the audience identifier 510 can forego audience recognition processing and, instead, use the reference audience identification information already associated with the reference scene represented by the matching reference signature to identify the audience 120 depicted in the detected scene represented by the key frame being analyzed. In such examples, the reference audience identification information (e.g., reference demographic information) for the matching reference scene is retrieved from the reference storage 235 by the audience identifier 510 and associated with the key frame currently being analyzed by the audience identifier 510.

In some examples, the audience recognizer 230 of FIG. 5 additionally or alternative prioritizes the audience recognition processing performed on a particular key frame based on the comparison result determined by the signature comparator 505 for the key frame. For example, the audience recognizer 230 of FIG. 5 can include an example queue 515 to store key frames awaiting processing by the audience identifier 510. The queue 515 may be implemented by any type of a storage or memory device, a database, etc., such as the mass storage device 1128 and/or the volatile memory 1114 included in the example processing system 1100 of FIG. 11, which is described in greater detail below. In such examples, the audience recognizer 230 of FIG. 5 includes an example queue processor 520 to assign key frames to the queue 515 with priorities that vary depending on whether the key image signatures representative of the key frames match (or substantially match) at least one of the reference signatures representative of the set of reference scenes depicting the reference audiences. For example, when assigning a particular key frame to the queue 515, the queue processor 520 can assign the key frame to the queue 515 with a first priority when the signature comparator 505 indicates that the key image signature corresponding to the key frame does not match any of the reference signatures representative of the reference audiences. However, the queue processor 520 can assign the key frame to the queue 515 with a second priority, which is lower than the first priority, when the signature comparator 505 indicates that the key image signature corresponding to the key frame matches at least one of the set of reference signatures representative of the reference audiences. In some examples, the queue processor 520 can assign key frames to the queue 515 based on a range of different possible priorities corresponding to, for example, how closely a particular key frame matches at least one of the reference images and/or how many images a key frame signature represents (e.g., corresponding to the number of images in the image sequence(s) represented by the key frame signature).

In such examples, the audience identifier 510 retrieves key frames from the queue 515 for audience recognition processing (e.g., such as facial recognition processing) based on the priorities associated with the respective key frames. Accordingly, the priorities assigned to the different key frames can be used to, for example, focus audience recognition processing on a new scene that does not match any of the reference scenes previously identified by the audience recognizer 230, or/and focus processing on those key frames that represent larger numbers of individual image frames. In some examples, because the key frames may be processed by the audience identifier 510 out of order due to their different priorities in the queue 515, the queue processor 520 also associates a timestamp with a key frame when assigning it to the queue to enable the resulting audience identification information determined by the audience identifier 510 for the key frame to be associated with the respective metering data determined by the site meter 125.

In some examples, the queue processor 520 also includes suggestion information for performing audience recognition processing on a scene's key frame that is assigned to the queue 515. For example, if the signature comparator 505 determines that the key image signature representative of the scene's key frame matches a reference signature, then the queue processor 520 can link suggestion information with the scene's key frame that includes likely facial positions, sizes, orientations, etc., that are associated with the identified audience corresponding to the matching reference signature. Such suggestion information can be used by the audience identifier 510 to, for example, initialize and/or guide a facial detection and recognition process with likely facial positions, sizes, orientations, etc., to speed up such processing.

After determining the audience identification information for the audience depicted in a particular key frame (e.g., by perform audience recognition processing and/or by using audience identification information already associated with a matching reference audience), the audience identifier 510 reports the audience identification information, as described above. Additionally, in some examples, the audience identifier 510 stores the audience identification information along with the key frame's image signature (and possibly the key frame, too) in the reference storage 235 for use as a reference image signature and associated reference audience identification information when processing a subsequent key frame in the sequence of key frames representing the sequence of scenes depicting subsequent audience(s) 120 to be identified.

While example manners of implementing the scene-based people meter 130 of FIG. 1 has been illustrated in FIGS. 2-5, one or more of the elements, processes and/or devices illustrated in FIGS. 2-5 may be combined, divided, re-arranged, omitted, eliminated and/or implemented in any other way. Further, the example sensor interface 215, the example scene change detector 225, the example audience recognizer 230, the example signature generator 305, the example signature comparator 310, the example image segmenter 315, the example key frame identifier 320, the example image clusterer 325, the example signature comparator 505, the example audience identifier 510, the example queue 515, the example queue processor 520 and/or, more generally, the example scene-based people meter 130 of FIGS. 1-5 may be implemented by hardware, software, firmware and/or any combination of hardware, software and/or firmware. Thus, for example, any of the example sensor interface 215, the example scene change detector 225, the example audience recognizer 230, the example signature generator 305, the example signature comparator 310, the example image segmenter 315, the example key frame identifier 320, the example image clusterer 325, the example signature comparator 505, the example audience identifier 510, the example queue 515, the example queue processor 520 and/or, more generally, the example scene-based people meter 130 could be implemented by one or more circuit(s), programmable processor(s), application specific integrated circuit(s) (ASIC (s)), programmable logic device(s) (PLD(s)) and/or field programmable logic device(s) (FPLD(s)), etc. When any of the apparatus or system claims of this patent are read to cover a purely software and/or firmware implementation, at least one of the example scene-based people meter 130, the example sensor interface 215, the example scene change detector 225, the example audience recognizer 230, the example signature generator 305, the example signature comparator 310, the example image segmenter 315, the example key frame identifier 320, the example image clusterer 325, the example signature comparator 505, the example audience identifier 510, the example queue 515 and/or the example queue processor 520 are hereby expressly defined to include a tangible computer readable medium such as a memory, digital versatile disk (DVD), compact disk (CD), Blu-ray Disc™, etc., storing such software and/or firmware. Further still, the example scene-based people meter 130 of FIGS. 1-5 may include one or more elements, processes and/or devices in addition to, or instead of, those illustrated in FIGS. 1-5, and/or may include more than one of any or all of the illustrated elements, processes and devices.

Flowcharts representative of example machine readable instructions for implementing the example scene-based people meter 130, the example sensor interface 215, the example scene change detector 225, the example audience recognizer 230, the example signature generator 305, the example signature comparator 310, the example image segmenter 315, the example key frame identifier 320, the example image clusterer 325, the example signature comparator 505, the example audience identifier 510, the example queue 515 and/or the example queue processor 520 are shown in FIGS. 6-10. In these examples, the machine readable instructions represented by each flowchart may comprise one or more programs for execution by a processor, such as the processor 1112 shown in the example processing system 1100 discussed below in connection with FIG. 11. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 1112, but the entire program or programs and/or portions thereof could alternatively be executed by a device other than the processor 1112 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 6-10 may be implemented manually. Further, although the example machine readable instructions are described with reference to the flowcharts illustrated in FIGS. 6-10, many other methods of implementing the example scene-based people meter 130, the example sensor interface 215, the example scene change detector 225, the example audience recognizer 230, the example signature generator 305, the example signature comparator 310, the example image segmenter 315, the example key frame identifier 320, the example image clusterer 325, the example signature comparator 505, the example audience identifier 510, the example queue 515 and/or the example queue processor 520 may alternatively be used. For example, with reference to the flowcharts illustrated in FIGS. 6-10, the order of execution of the blocks may be changed, and/or some of the blocks described may be changed, eliminated, combined and/or subdivided into multiple blocks.

As mentioned above, the example processes of FIGS. 6-10 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 6:
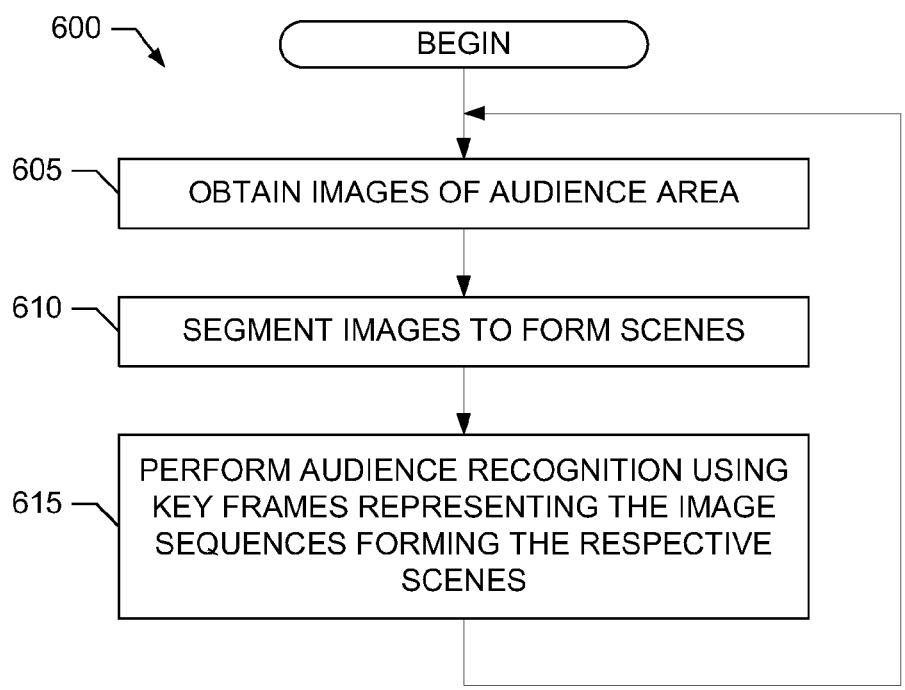
FIG. 6 is a flowchart representative of example machine readable instructions that may be executed to implement the example scene-based people meter of FIG. 2.

Example machine readable instructions 600 that may be executed to implement the example scene-based people meter 130 of FIGS. 1-5 are represented by the flowchart shown in FIG. 6. The example machine readable instructions 600 may be executed at predetermined intervals, based on an occurrence of a predetermined event, etc., or any combination thereof. With reference to the preceding figures, the machine readable instructions 600 of FIG. 6 begin execution at block 605 at which the sensor interface 215 of the scene-based people meter 130 causes the imaging sensor 205 to obtain (e.g., capture) image frames of the audience area 115 at a configured/specified frame rate. The sensor interface 215 stores the obtained image frames in the image storage 220. As described above, the image frames obtained at block 605 depict a location (e.g., the audience area 115) in which an audience (e.g., the audience 120) is expected to be present.

At block 610, the scene change detector 225 of the scene-based people meter 130 segments (groups) the image frames obtained by the image sensor 205 and stored in the image storage 220 into a sequence of scenes (e.g., corresponding to a respective sequence of image frames) for which audience identification is to be performed. At block 610, the scene change detector 225 also determines respective key frames to represent the detected scenes. As such, the key frame for a particular scene depicts the composition of the audience 120 corresponding to that scene. As described above, each next scene in the sequence of scenes detected by the scene change detector 225 at block 610 corresponds to a likely change in the composition of the audience 120 in the audience area 115 and/or in its environment.

At block 615, the audience recognizer 230 of the scene-based people meter 130 performs audience recognition using the key frames that represent the image sequences forming the respective scenes detected at block 610. As described above, at block 615, the audience recognizer 230 focuses audience recognition processing on just the key frames determined at block 610 instead of all of the image frames obtained at block 605, which can significantly reduce the processing costs associated with the scene-based people meter 130. Processing then returns to block 605 and blocks subsequent thereto to enable scene-based people metering to continue at the monitored site 105. Although FIG. 6 illustrates that processing at blocks 605-615 as being performed serially in a single thread, in some examples, the processing performed at some of all of blocks 605-615 can be performed at the same time (e.g., in parallel) in multiple (e.g., three) processing threads.

In some examples, at block 615 the audience recognizer 230 performs audience recognition using just the representative key frames of the scene clusters formed by grouping similar scenes into clusters, as described above. In such examples, the audience recognizer 230 performs audience recognition on just the representative key frame for each scene cluster (e.g., and in an order based the ranking/priority of the key frames representative of the clusters), and then propagates the resulting audience identification information determined for representative key frame of a particular scene cluster to all key frames and corresponding scenes included in the particular scene cluster.

Figure 7:
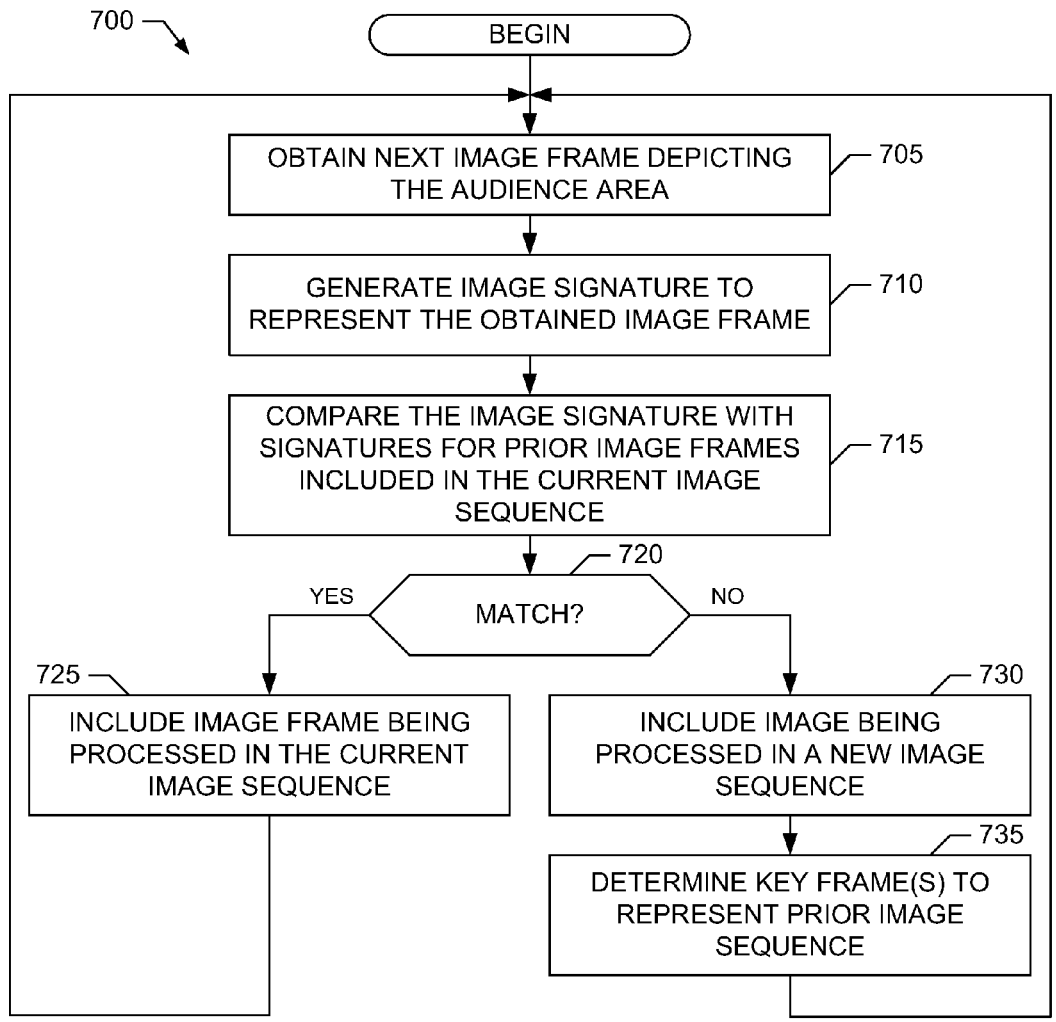
FIG. 7 is a flowchart representative of example machine readable instructions that may be executed to implement the example scene change detector of FIG. 3.

Example machine readable instructions 700 that may be executed to implement the example scene change detector 225 of FIGS. 2-4 are represented by the flowchart shown in FIG. 7. The example machine readable instructions 700 may be executed at predetermined intervals, based on an occurrence of a predetermined event, etc., or any combination thereof. With reference to the preceding figures, the machine readable instructions 700 of FIG. 7 begin execution at block 705 at which the signature generator 305 of the scene change detector 225 obtains, from the image storage 220, a next image frame that depicts the audience area 115 being monitored using the imaging sensor 205. At block 710, the signature generator 305 generates an image signature representative of the image frame obtained at block 705, as described above. At block 715, the image segmenter 315 of the scene change detector 225 uses the signature comparator 310 to compare the image signature generated at block 710 with the image signature(s) for the prior image frames already included in the image sequence for the current scene being detected. For example, at block 715, the image segmenter 315 can use the signature comparator 310 to compare the image signature for the next image frame obtained at block 705 with the image signature for the starting frame of the sequence of images forming the current scene being detected, as described above.

At block 720, the image segmenter 315 determines whether the image signature determined at block 710 for the next image frame obtained at block 705 matches (or substantially matches) the image signature for the prior image frames already included in the image sequence forming the scene currently being detected (e.g., by determining whether the image signature for the next image frame matches the starting frame's image signature). If the signatures match (block 720), then at block 725 the image segmenter 315 includes the next image frame obtained at block 705 in the image sequence forming the current scene being detected, as described above. However, if the signatures do not match (block 720), then at block 730 the image segmenter 315 concludes detection of the current scene and uses the next image frame obtained at block 705 as the starting frame for a new image sequence that will form the next scene to be detected. Also, at block 735, the key frame identifier 320 of the scene change detector 225 determines key frame(s) to be used to represent the image sequence for the current scene for which detection has concluded, as described above. Processing then returns to block 705 and blocks subsequent thereto to enable a next scene to be detected and formed from the sequence of image frames depicting the audience area 115.

Figure 8:
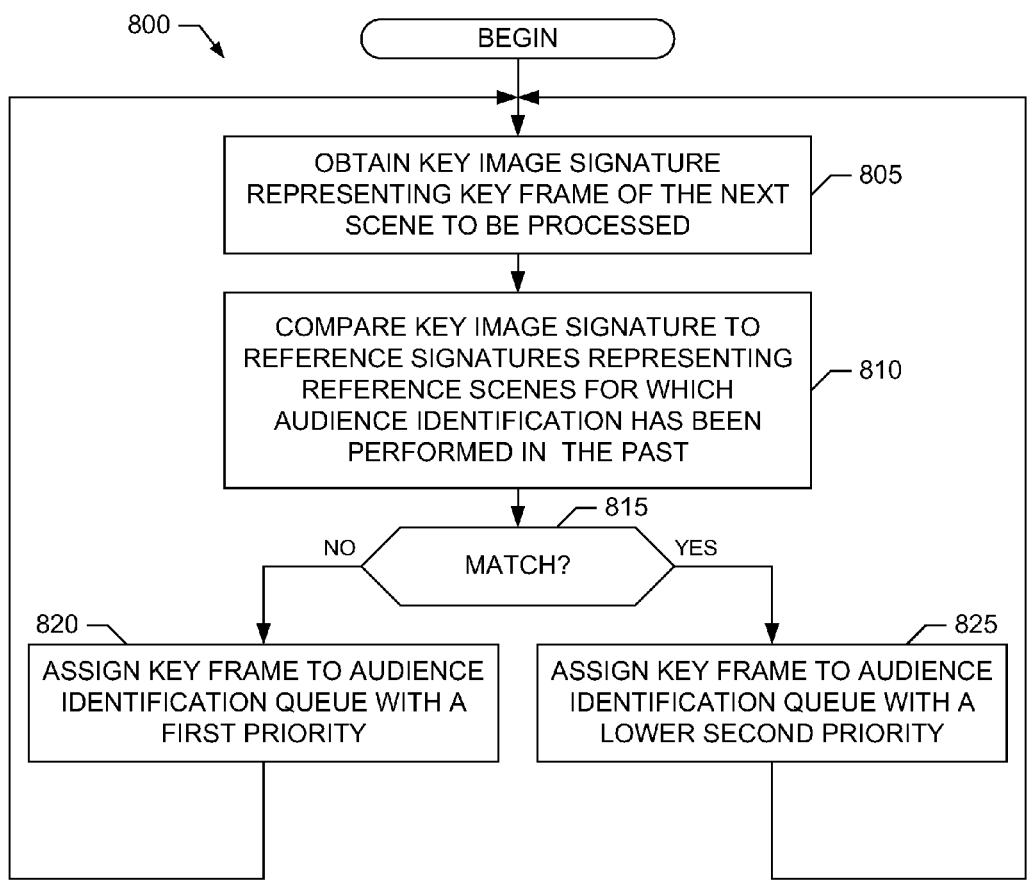
FIG. 8 is a flowchart representative of first example machine readable instructions that may be executed to implement the example audience recognizer of FIG. 5.

First example machine readable instructions 800 that may be executed to implement the example audience recognizer 230 of FIGS. 2 and 5 are represented by the flowchart shown in FIG. 8. The example machine readable instructions 800 may be executed at predetermined intervals, based on an occurrence of a predetermined event, etc., or any combination thereof. With reference to the preceding figures, the machine readable instructions 800 of FIG. 8 begin execution at block 805 at which the signature comparator 505 of the audience recognizer 230 obtains the key image signature representing the key frame of the next scene for which audience recognition processing is to be performed. At block 810, the signature comparator 505 compares the key image signature with the set of reference signatures stored in the reference storage 235, and which represent the set of reference scenes depicting the set of reference audiences for which the audience recognizer 230 has performed audience identification in the past, as described above.

At block 815, queue processor 520 examines the result of comparing the key image signature with the set of reference signatures that was determined by the signature comparator 505 at block 810. If the comparison result indicates that the key image signature did not match any of the reference signatures (block 815), then at block 820 the queue processor 520 assigns the key frame(s) obtained at block 805 to the queue 515 with a first (e.g., high) priority, as described above. The audience identifier 510 will later retrieve the key frame from the queue 515 for audience recognition processing in accordance with its assigned (e.g., higher) priority. However, if the comparison result indicates that the key image signature matched at least one of the reference signatures (block 815), then at block 825 the queue processor 520 assigns the key frame(s) obtained at block 805 to the queue 515 with a second (e.g., low) priority, as described above. In some examples, the queue processor 520 also includes suggestion information for performing audience recognition processing on the key frame. For example, the suggestion information can include likely facial positions, sizes, orientations, etc., that are associated with a matching reference signature. Such suggestion information can be used to, for example, initialize and/or guide a facial detection and recognition process with likely facial positions, sizes, orientations, etc., to speed up such processing. The audience identifier 510 will later retrieve the key frame (and any associated suggestion information) from the queue 515 for audience recognition processing in accordance with its assigned (e.g., lower) priority. Processing then returns to block 805 and blocks subsequent thereto to enable audience recognition to be performed for a next scene in the sequence of scenes depicting the audience area 115.

Figure 9:
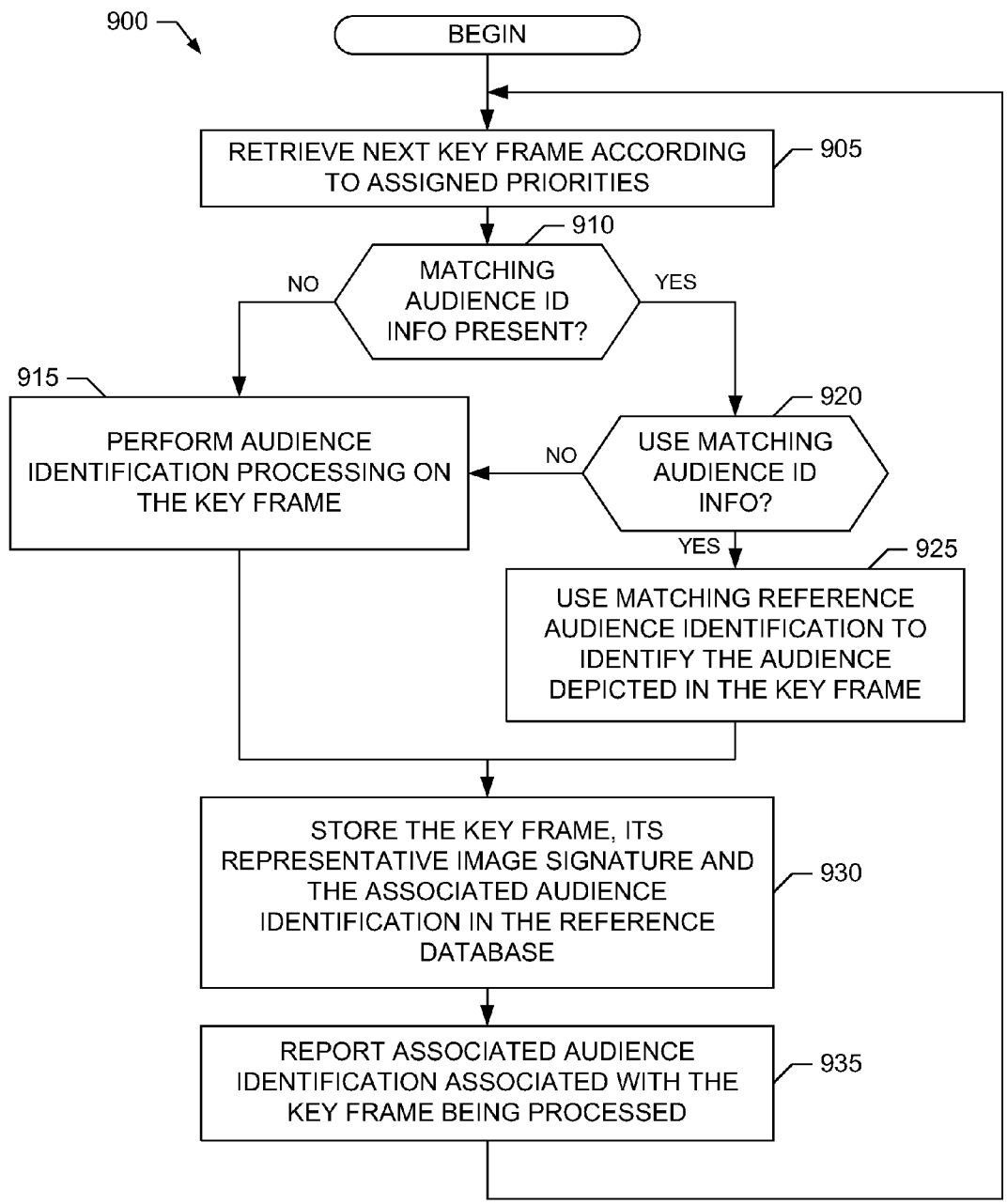
FIG. 9 is a flowchart representative of second example machine readable instructions that may be executed to implement the example audience recognizer of FIG. 5.

Second example machine readable instructions 900 that may be executed to implement the example audience recognizer 230 of FIGS. 2 and 5 are represented by the flowchart shown in FIG. 9. The example machine readable instructions 900 may be executed at predetermined intervals, based on an occurrence of a predetermined event, etc., or any combination thereof. With reference to the preceding figures, the machine readable instructions 900 of FIG. 9 begin execution at block 905 at which the audience identifier 510 of the audience recognizer 230 retrieves a next key frame (and any associated audience recognition suggestion information) from the queue 515 for audience recognition processing in accordance with the priorities assigned to the key frames in the queue 515, as described above. For example, the audience identifier 510 may retrieve key frames for audience recognition processing in order of priority from highest to lowest.

At block 910, the audience identifier 510 determines whether audience identification information is already associated with the key frame being processed. This may occur, for example, when the key frame was determined to match a reference scene depicting a reference audience and the audience identifier 510 has already associated the matching reference audience's identification information with the current key frame being processed. If audience identification information is not already associated with the key frame (block 910), then at block 915 the audience identifier 510 performs audience identification processing (e.g., such as facial recognition processing and/or any other type(s) and/or number of identification techniques) on the key frame retrieved from the queue 515 at block 905 (with the audience identification processing being initialized with any suggestion information associated with the key frame, as described above). At block 915, the audience identifier 510 associates the identification information determined via the recognition processing with the key frame being processed. However, if audience identification information is already associated with the key frame (block 910), then at block 925 the audience identifier 510 determines whether that pre-existing audience information (e.g., the reference audience information associated with the matching reference scene) is to be used to identify the audience depicted in the key frame, or if audience identification processing (e.g., such as facial recognition processing) is to be performed on the key frame regardless of any matching reference audience information that is present. For example, to prevent audience identification errors from propagating indefinitely, the audience identifier 510 may select key frames having matching reference audience information at random (e.g., with some probability) to undergo audience identification processing in lieu of using the reference audience identification information to identify the audience in the key frame. If the audience identifier 510 determines that the matching reference audience information is to be used to identify the audience depicted in the key frame (block 920), then at block 925 the audience identifier 510 uses the matching reference audience identification information to identify the audience depicted in the key frame. Otherwise, the audience identifier 510 identifies the audience depicted in the key frame via the recognition processing performed at block 910, as described above.

Next, at block 930, the audience identifier 510 stores the key frame's image signature and the audience identification information determined for the key frame in the reference storage 235. This information then becomes further reference information for use in perform audience recognition processing on subsequent key frames. At block 935, the reports the audience identification information for the key frame being processed to the site meter 125, as described above. Processing then returns to block 905 and blocks subsequent thereto to enable audience recognition to be performed for a next scene in the sequence of scenes depicting the audience area 115.

Figure 10:
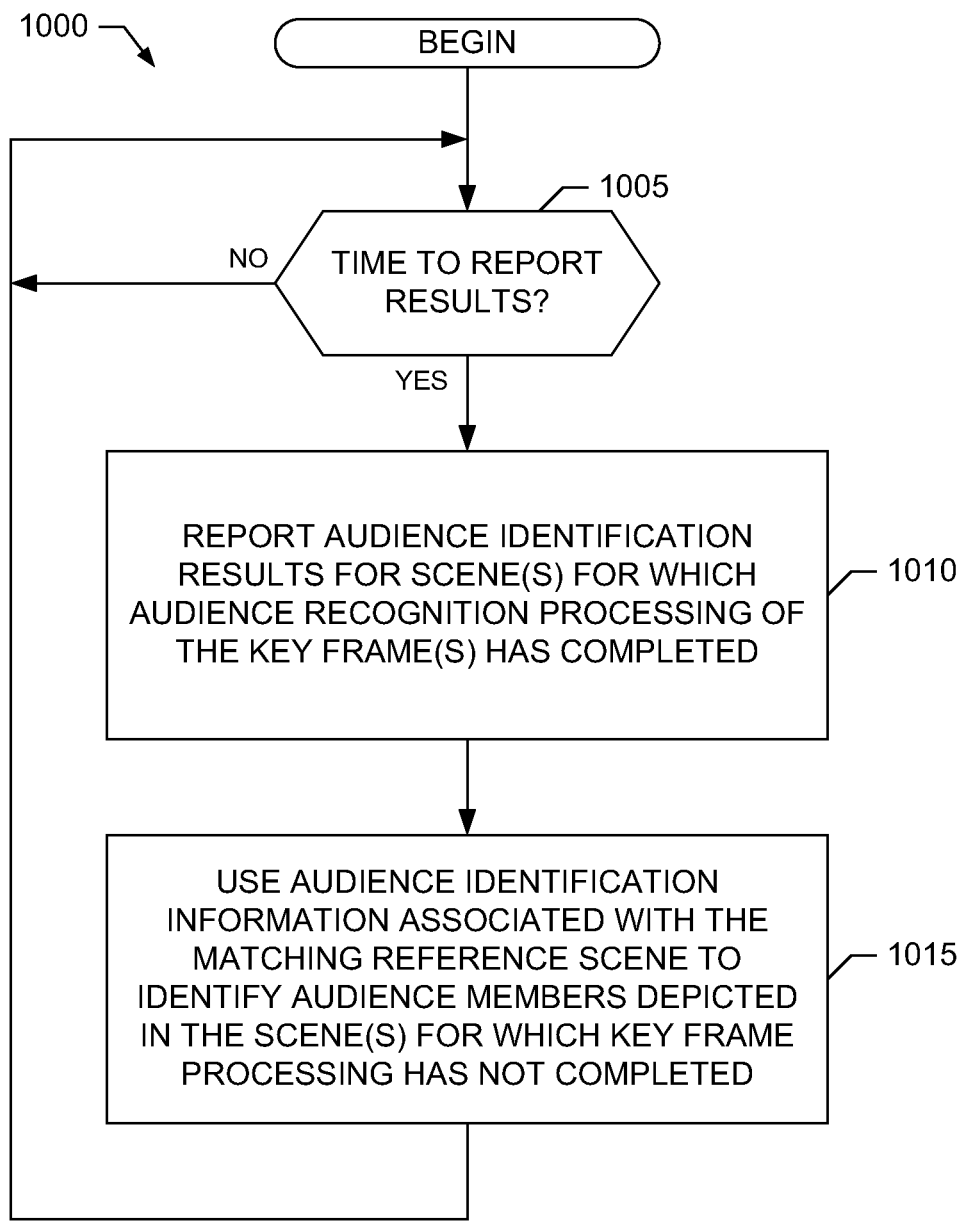
FIG. 10 is a flowchart representative of third example machine readable instructions that may be executed to implement the example audience recognizer of FIG. 5.

Third example machine readable instructions 1000 that may be executed to implement the example audience recognizer 230 of FIGS. 2 and 5 are represented by the flowchart shown in FIG. 10. The example machine readable instructions 1000 may be executed at predetermined intervals, based on an occurrence of a predetermined event, etc., or any combination thereof. With reference to the preceding figures, the machine readable instructions 1000 of FIG. 9 begin execution at block 1005 at which the audience identifier 510 of the audience recognizer 230 determines whether it is time to report people metering results to the data processing facility 140. If it is time to report people metering results, then at block 1010 the audience identifier 510 reports the audience identification information for the scenes for which processing (e.g., for which facial recognition processing, as described above) of their respective key frames has completed. At block 1015, the audience identifier 510 handles reporting of audience identification information for scenes for which key frame processing has not completed by the time the people metering results are to be reported. In some examples, for each scene for which key frame processing has not completed, at block 1015 the audience identifier 510 uses the reference audience identification (e.g., reference demographic information) already associated with the reference audience corresponding to reference signature that matched the key frame's image signature to identify the audience 120 depicted in the key frame, as described above. In some examples, if the key image signature of an unprocessed key frame did not match any reference signature, then at block 1015 the audience identifier 510 may report that the audience information for the scene corresponding to that key frame is unknown or NULL.

Figure 11:
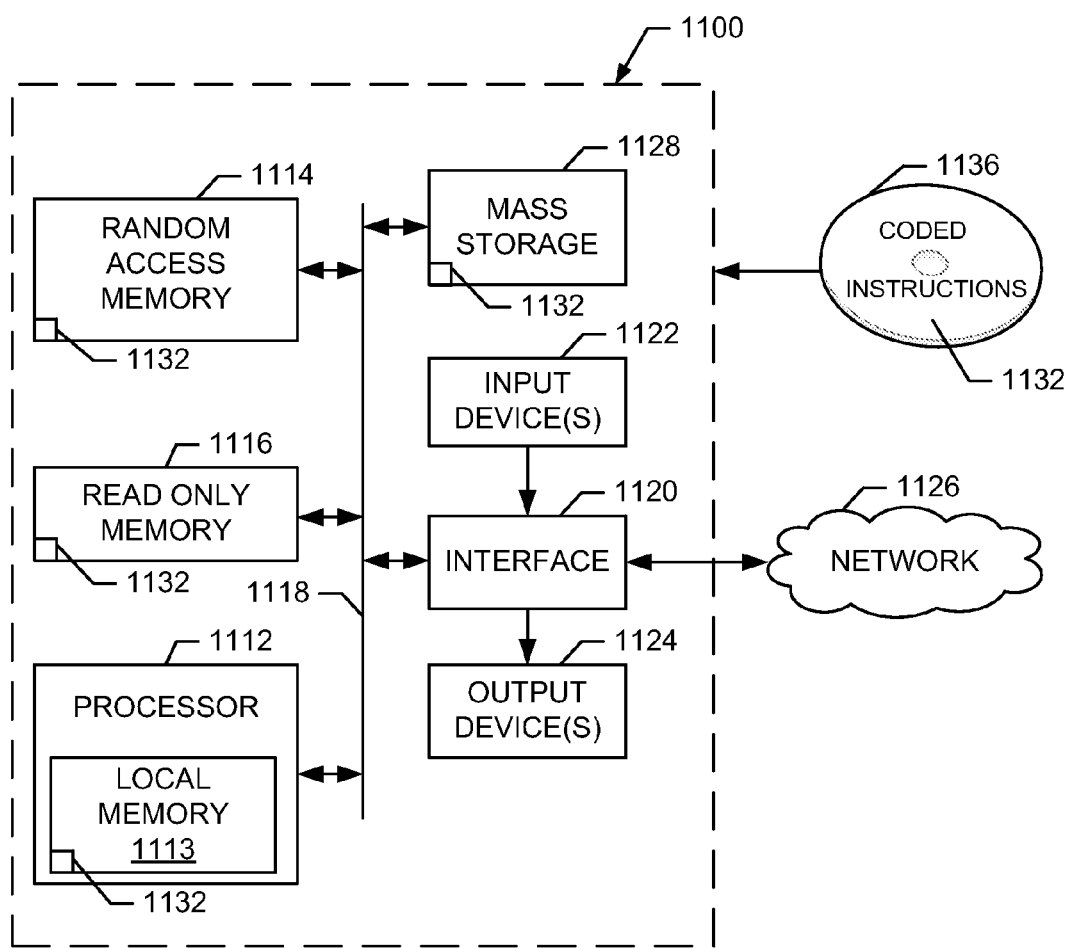
FIG. 11 is a block diagram of an example processing system that may execute the example machine readable instructions of FIGS. 6-8 and/or 9 to implement the example scene-based people meter of FIG. 2, the scene change detector of FIG. 3, the example audience recognizer of FIG. 5 and/or the example audience measurement system of FIG. 1.

FIG. 11 is a block diagram of an example processing system 1100 capable of executing the instructions of FIGS. 6-10 to implement the example scene-based people meter 130, the example sensor interface 215, the example scene change detector 225, the example audience recognizer 230, the example signature generator 305, the example signature comparator 310, the example image segmenter 315, the example key frame identifier 320, the example image clusterer 325, the example signature comparator 505, the example audience identifier 510, the example queue 515 and/or the example queue processor 520 of FIGS. 1-5. The processing system 1100 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1100 of the instant example includes a processor 1112. For example, the processor 1112 can be implemented by one or more microprocessors and/or controllers from any desired family or manufacturer.

The processor 1112 includes a local memory 1113 (e.g., a cache) and is in communication with a main memory including a volatile memory 1114 and a non-volatile memory 1116 via a bus 1118. The volatile memory 1114 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processing system 1100 also includes an interface circuit 1120. The interface circuit 1120 may be implemented by any type of interface standard, such as an Ethernet interface, a universal serial bus (USB), and/or a PCI express interface.

One or more input devices 1122 are connected to the interface circuit 1120. The input device(s) 1122 permit a user to enter data and commands into the processor 1112. The input device(s) can be implemented by, for example, a keyboard, a mouse, a touchscreen, a track-pad, a trackball, a trackbar (such as an isopoint), a voice recognition system and/or any other human-machine interface.

One or more output devices 1124 are also connected to the interface circuit 1120. The output devices 1124 can be implemented, for example, by display devices (e.g., a liquid crystal display, a cathode ray tube display (CRT)), a printer and/or speakers. The interface circuit 1120, thus, typically includes a graphics driver card.

The interface circuit 1120 also includes a communication device, such as a modem or network interface card, to facilitate exchange of data with external computers via a network 1126 (e.g., an Ethernet connection, a digital subscriber line (DSL), a telephone line, coaxial cable, a cellular telephone system, etc.).

The processing system 1100 also includes one or more mass storage devices 1128 for storing machine readable instructions and data. Examples of such mass storage devices 1128 include floppy disk drives, hard drive disks, compact disk drives and digital versatile disk (DVD) drives. In some examples, the mass storage device 1030 may implement the image storage 220, the reference storage 235 and/or the queue 515. Additionally or alternatively, in some examples the volatile memory 1118 may implement the image storage 220, the reference storage 235 and/or the queue 515.

Coded instructions 1132 corresponding to the instructions of FIGS. 6-10 may be stored in the mass storage device 1128, in the volatile memory 1114, in the non-volatile memory 1116, in the local memory 1113 and/or on a removable storage medium, such as a CD or DVD 1136.

As an alternative to implementing the methods and/or apparatus described herein in a system such as the processing system of FIG. 11, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to perform people metering for audience measurement, the method comprising:
   segmenting image frames depicting a location in which an audience is expected to be present to form a sequence of scenes;
   for a first scene in the sequence of scenes, identifying a first key frame representing a first sequence of image frames corresponding to the first scene; and
   processing the first key frame to identify an audience depicted in the first scene, wherein processing the first key frame comprises:
      comparing an image signature representative of the first key frame with a set of reference signatures representative of a set of reference scenes to determine a comparison result; and
      processing the first key frame based on the comparison result to identify the audience depicted in the first scene, wherein processing the first key frame based on the comparison result comprises:
         assigning the first key frame to a processing queue with a first priority when the comparison result indicates that the image signature does not match at least one reference signature in the set of reference signatures;
         assigning the first key frame to the processing queue with a second priority when the comparison result indicates that the image signature matches at least one reference signature in the set of reference signatures, the second priority being lower than the first priority; and
         using priorities associated with key frames included in the processing queue to prioritize performing processing on the key frames to identify respective audiences depicted in respective scenes represented by the key frames, the key frames including the first key frame.

2. A method as defined in claim 1, wherein segmenting the sequence of image frames comprises:
   determining image signatures representative of the image frames; and
   grouping successive frames having similar image signatures into respective sequences of the image frames, respective sequences of image frames forming respective scenes in the sequence of scenes.

3. A method as defined in claim 1, wherein the first key frame comprises at least one of a starting image frame, a midpoint image frame, an ending image frame or a statistical combination of the first sequence of image frames forming the first scene.

4. A method as defined in claim 1, wherein processing the first key frame further comprises performing facial recognition processing on the first key frame to identify the audience depicted in the first scene.

5. A method as defined in claim 1, wherein processing the first key frame based on the comparison result further comprises, when the comparison result indicates that the image signature matches a first reference signature in the set of reference signatures, using audience identification information associated with a first reference scene represented by the first reference signature to identify the audience depicted in the first scene.

6. A method as defined in claim 1, further comprising:
   associating audience identification information with the image signature; and
   including the image signature in the set of reference signatures for comparison with a second image signature representative of a subsequent scene occurring after the first scene.

7. A tangible machine readable medium comprising machine readable instructions which, when executed, cause a machine to at least:
   segment image frames depicting a location in which an audience is expected to be present to form a sequence of scenes;
   for a first scene in the sequence of scenes, identify a first key frame representing a first sequence of image frames corresponding to the first scene; and
   process the first key frame to identify an audience depicted in the first scene, wherein to process the first key frame, the machine readable instructions, when executed, further cause the machine to:
      compare an image signature representative of the first key frame with a set of reference signatures representative of a set of reference scenes to determine a comparison result; and
      process the first key frame based on the comparison result to identify the audience depicted in the first scene, wherein the machine readable instructions, when executed, further cause the machine to:
         assign the first key frame to a processing queue with a first priority when the comparison result indicates that the image signature does not match at least one reference signature in the set of reference signatures;
         assign the first key frame to the processing queue with a second priority when the comparison result indicates that the image signature matches at least one reference signature in the set of reference signatures, the second priority being lower than the first priority; and
         use priorities associated with key frames included in the processing queue to prioritize performing processing on the key frames to identify respective audiences depicted in respective scenes represented by the key frames, the key frames including the first key frame.

8. A tangible machine readable medium as defined in claim 7, wherein the first key frame comprises at least one of a starting image frame, a midpoint image frame, an ending image frame or a statistical combination of the first sequence of image frames forming the first scene.

9. A tangible machine readable medium as defined in claim 7, wherein to process the first key frame, the machine readable instructions, when executed, further cause the machine to perform facial recognition processing on the first key frame to identify the audience depicted in the first scene.

10. A tangible machine readable medium as defined in claim 7, wherein to segment the sequence of image frames, the machine readable instructions, when executed, further cause the machine to:
    determine image signatures representative of the image frames; and
    group successive frames having similar image signatures into respective sequences of image frames, respective sequences of image frames forming respective scenes in the sequence of scenes.

11. A tangible machine readable medium as defined in claim 7, wherein the machine readable instructions, when executed, further cause the machine to use audience identification information associated with a first reference scene represented by a first reference signature to identify the audience depicted in the first scene when the comparison result indicates that the image signature matches the first reference signature.

12. A tangible machine readable medium as defined in claim 7, wherein the machine readable instructions, when executed, further cause the machine to:
   associate audience identification information with the image signature; and
   include the image signature in the set of reference signatures for comparison with a second image signature representative of a subsequent scene occurring after the first scene.

13. An apparatus to identify people in an audience, the apparatus comprising:
   a scene change detector to segment image frames depicting a location in which an audience is expected to be present to form a sequence of scenes; and
   an audience recognizer to process a first key frame representing a first sequence of image frames corresponding to a first scene in the sequence of scenes to identify an audience depicted in the first scene, wherein the audience recognizer is further to:
      compare an image signature representative of the first key frame with a set of reference signatures representative of a set of reference scenes to determine a comparison result; and
      process the first key frame based on the comparison result to identify the audience depicted in the first scene;
      assign the first key frame to a processing queue with a first priority when the comparison result indicates that the image signature does not match at least one reference signature in the set of reference signatures;
      assign the first key frame to the processing queue with a second priority when the comparison results indicates that the image signature matches at least one reference signature in the set of reference signatures, the second priority being lower than the first priority; and
      use priorities associated with key frames included in the processing queue to prioritize performing processing on the key frames to identify respective audiences depicted in respective scenes represented by the key frames, the key frames including the first key frame.

14. An apparatus as defined in claim 13, wherein the scene change detector is to:
   determine image signatures representative of the image frames; and
   include successive frames having similar image signatures into respective sequences of image frames, respective sequences forming respective scenes in the sequence of scenes.

15. An apparatus as defined in claim 13, wherein the first key frame comprises at least one of a starting image frame, a midpoint image frame, an ending image frame or a statistical combination of the first sequence of image frames forming the first scene.

16. An apparatus as defined in claim 13, wherein the audience recognizer is to use first audience identification information associated with a first reference scene represented by a first reference signature to identify the audience depicted in the first scene when the comparison result indicates that the image signature matches the first reference signature.

17. An apparatus as defined in claim 13, wherein to process the first key frame, the audience recognizer is further to perform facial recognition processing on the first key frame to identify the audience depicted in the first scene.

18. An apparatus as defined in claim 13, wherein the audience recognizer is further to:
   associate audience identification information with the image signature; and
   include the image signature in the set of reference signatures for comparison with a second image signature representative of a subsequent scene occurring after the first scene.

* * * * *